US012723520B1

(12) United States Patent
Yazici et al.

(10) Patent No.: US 12,723,520 B1
(45) Date of Patent: Sep. 1, 2026

(54) VARIABLE GUIDE VANE FOR AIRCRAFT PROPULSION SYSTEM

(71) Applicant: RTX Corporation, Farmington, CT (US)

(72) Inventors: Murat Yazici, Glastonbury, CT (US); Jeffrey T. Morton, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/222,520

(22) Filed: May 29, 2025

(51) Int. Cl.
*F01D 17/16* (2006.01)
*F01D 5/14* (2006.01)
*F01D 9/04* (2006.01)

(52) U.S. Cl.
CPC ........... *F01D 17/162* (2013.01); *F01D 5/141* (2013.01); *F01D 9/041* (2013.01); *F05D 2220/323* (2013.01); *F05D 2240/12* (2013.01)

(58) Field of Classification Search
CPC ........ F01D 17/162; F01D 5/141; F01D 9/041; F05D 2220/323; F05D 2240/12; F02C 7/042
See application file for complete search history.

(56) References Cited

U.S. PATENT DOCUMENTS 3,687,569 A * 8/1972 Klompas ............... F04D 29/323 416/207
4,770,605 A * 9/1988 Nakatomi ............. F04D 29/462 415/164
4,950,129 A * 8/1990 Patel ......................... F01D 5/26 415/148
6,179,559 B1 * 1/2001 Weaver ................. F04D 29/563 415/161
6,283,705 B1 * 9/2001 Rice ...................... F04D 29/563 415/162

(Continued)

FOREIGN PATENT DOCUMENTS

EP 3599349 A1 * 1/2020 ........... F04D 29/544
FR 3082230 B1 8/2020
WO 2025022080 A1 1/2025

OTHER PUBLICATIONS

Binder et al. FR 1855080, English Machine Translation (Year: 2018).*

*Primary Examiner* — Nathaniel E Wiehe
*Assistant Examiner* — Wayne A Lambert
(74) *Attorney, Agent, or Firm* — Getz Balich LLC

(57) ABSTRACT

A propulsion system assembly includes an open propulsor rotor and an open guide vane structure. The open guide vane structure is axially next to the open propulsor rotor. The open guide vane structure includes a plurality of open guide vanes arranged circumferentially about a rotational axis in an array. An airfoil of a first of the open guide vanes includes a base, a tip, a first side surface, a second side surface, a leading edge, a trailing edge and a mean line. The airfoil projects spanwise out from the base to the tip. The airfoil extends laterally between the first side surface and the second side surface. The airfoil extends longitudinally along the mean line between the leading edge and the trailing edge. The first open guide vane is configured to pivot about a pivot axis which is axially offset along the rotational axis from the airfoil at the base.

17 Claims, 6 Drawing Sheets

(56) References Cited

U.S. PATENT DOCUMENTS

| | | | | |
|---|---|---|---|---|
| 6,461,105 | B1 * | 10/2002 | Nicolson | F01D 17/165 416/223 R |
| 6,602,049 | B2 * | 8/2003 | Caubet | F01D 5/143 415/160 |
| 6,843,638 | B2 * | 1/2005 | Hidalgo | F01D 17/162 415/189 |
| 7,264,441 | B2 * | 9/2007 | Loudet | F04D 29/563 415/199.5 |
| 7,806,652 | B2 * | 10/2010 | Major | F04D 29/563 416/223 R |
| 8,206,090 | B2 * | 6/2012 | Cloarec | F04D 29/563 415/230 |
| 8,672,618 | B2 * | 3/2014 | Guemmer | F01D 17/162 415/162 |
| 8,721,269 | B2 * | 5/2014 | Abadie | F01D 17/162 415/160 |
| 8,734,088 | B2 * | 5/2014 | Jones | F01D 25/02 415/162 |
| 10,208,619 | B2 * | 2/2019 | Jones | F01D 17/162 |
| 10,753,278 | B2 * | 8/2020 | Nestico | F02C 9/20 |
| 10,794,281 | B2 * | 10/2020 | Nestico | F01D 17/14 |
| 11,162,376 | B2 * | 11/2021 | Stiehler | F04D 29/563 |
| 12,203,385 | B1 * | 1/2025 | Morton | B64C 11/00 |
| 12,352,287 | B1 * | 7/2025 | Morton | F01D 7/00 |
| 2016/0333729 | A1 | 11/2016 | Miller | |
| 2017/0218842 | A1 * | 8/2017 | Nestico | F04D 29/563 |
| 2017/0284296 | A1 * | 10/2017 | Nestico | F02C 7/057 |
| 2020/0040747 | A1 * | 2/2020 | Tsukioka | F01D 9/042 |
| 2025/0043688 | A1 | 2/2025 | Carle | |

* cited by examiner

VARIABLE GUIDE VANE FOR AIRCRAFT PROPULSION SYSTEM

BACKGROUND OF THE DISCLOSURE

1. Technical Field

This disclosure relates generally to an aircraft and, more particularly, to a guide vane structure for an aircraft propulsion system.

2. Background Information

An aircraft propulsion system may include a guide vane structure arranged downstream of a propulsor rotor to condition air propelled by the propulsor rotor. Various types and configurations of guide vane structures are known in the art. While these known guide vane structures have various benefits, there is still room in the art for improvement.

SUMMARY OF THE DISCLOSURE

According to an aspect of the present disclosure, an assembly is provided for an aircraft propulsion system. This assembly includes an open propulsor rotor and an open guide vane structure. The open propulsor rotor is configured to rotate about a rotational axis. The open guide vane structure is axially next to the open propulsor rotor. The open guide vane structure includes a plurality of open guide vanes arranged circumferentially about the rotational axis in an array. The open guide vanes include a first open guide vane. An airfoil of the first open guide vane includes a base, a tip, a first side surface, a second side surface, a leading edge, a trailing edge and a mean line. The airfoil projects spanwise out from the base to the tip. The airfoil extends laterally between the first side surface and the second side surface. The airfoil extends longitudinally along the mean line between the leading edge and the trailing edge. The first open guide vane is configured to pivot about a pivot axis. The pivot axis is axially offset along the rotational axis from the airfoil at the base.

According to another aspect of the present disclosure, another assembly is provided for an aircraft propulsion system. This assembly includes an open propulsor rotor and an open guide vane structure. The open propulsor rotor is configured to rotate about a rotational axis. The open guide vane structure is axially next to the open propulsor rotor. The open guide vane structure includes a plurality of open guide vanes arranged circumferentially about the rotational axis in an array. The open guide vanes include a first open guide vane. The airfoil of the first open guide vane includes a base, a tip, a first side surface, a second side surface, a leading edge, a trailing edge and a chord length. The airfoil projects spanwise out from the base to the tip. The airfoil extends laterally between the first side surface and the second side surface. The airfoil extends chordwise for the chord length between the leading edge and the trailing edge at a midspan location spanwise between the base and the tip. The first open guide vane is configured to pivot about a pivot axis. The pivot axis is axially aligned along the rotational axis with a section of the airfoil at the midspan location. The pivot axis is spaced an axial distance along the rotational axis from a reference edge of the airfoil that is equal to or less than thirty-five percent of the chord length. The reference edge includes the leading edge or the trailing edge.

According to still another aspect of the present disclosure, another assembly is provided for an aircraft propulsion system. This assembly includes an open propulsor rotor and an open guide vane structure. The open propulsor rotor is configured to rotate about a rotational axis. The open guide vane structure is axially next to the open propulsor rotor. The open guide vane structure includes a plurality of open guide vanes arranged circumferentially about the rotational axis in an array. The open guide vanes include a first open guide vane. An airfoil of the first open guide vane includes a base, a tip, a first side surface, a second side surface, a leading edge, a trailing edge and a mean line. The airfoil projects spanwise out from the base to the tip. The airfoil extends laterally between the first side surface and the second side surface. The airfoil extends longitudinally along the mean line between the leading edge and the trailing edge. The first open guide vane is configured to pivot about a pivot axis. The pivot axis is disposed axially downstream of a longitudinal center of the airfoil along the mean line between the leading edge and the trailing edge.

The pivot axis may be disposed axially downstream of the longitudinal center of the airfoil along the mean line between the leading edge and the trailing edge at the base of the airfoil.

The pivot axis may be disposed axially downstream of the longitudinal center of the airfoil along the mean line between the leading edge and the trailing edge at the tip of the airfoil.

The pivot axis may be disposed axially downstream of the longitudinal center of the airfoil along the mean line between the leading edge and the trailing edge at a midspan location spanwise between the base and the tip.

The axial distance may be equal to or less than thirty percent of the chord length.

The axial distance may be equal to or less than twenty-five percent of the chord length.

The pivot axis may be axially aligned with the reference edge at the base. Alternatively, the pivot axis may be axially offset along the rotational axis from the airfoil at the base.

The pivot axis may be axially adjacent the airfoil along the rotational axis at the base.

The pivot axis may be axially spaced from the airfoil along the rotational axis at the base.

The pivot axis may be axially upstream of a portion of the leading edge along the rotational axis at the base.

The pivot axis may be axially downstream of a portion of the trailing edge along the rotational axis at the base.

A button of the first open guide vane may be connected to the airfoil at the base. The button may include an annular outer surface that extends circumferentially around and is coaxial with the pivot axis.

A section of the airfoil may project longitudinally out and away from the button along the mean line to the trailing edge.

A section of the airfoil may project longitudinally out and away from the button along the mean line to the leading edge.

The pivot axis may be disposed axially between the leading edge and the trailing edge when viewed at an intermediate span location spanwise between the base and the tip.

The airfoil may have a chord length between the leading edge and the trailing edge at a midspan location between the base and the tip. A section of the airfoil at the midspan location may axially overlap the pivot axis along the rotational axis. An axial distance along the rotational axis between the pivot axis and a reference edge of the airfoil may be equal to or less than thirty-five percent of the chord length. The reference edge may be the leading edge or the trailing edge.

The reference edge may be the leading edge.

The reference edge may be the trailing edge.

The open guide vane structure may be configured to condition air propelled by the open propulsor rotor in an environment external to the aircraft propulsion system.

The pivot axis may be coplanar with the rotational axis.

The pivot axis may be non-coplanar with the rotational axis.

The pivot axis may be perpendicular to the rotational axis in a reference plane parallel with the rotational axis.

The pivot axis may be angularly offset from the rotational axis by an acute angle in a reference plane parallel with the rotational axis.

The assembly may also include a turbine engine configured to drive rotation of the open propulsor rotor about the rotational axis.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
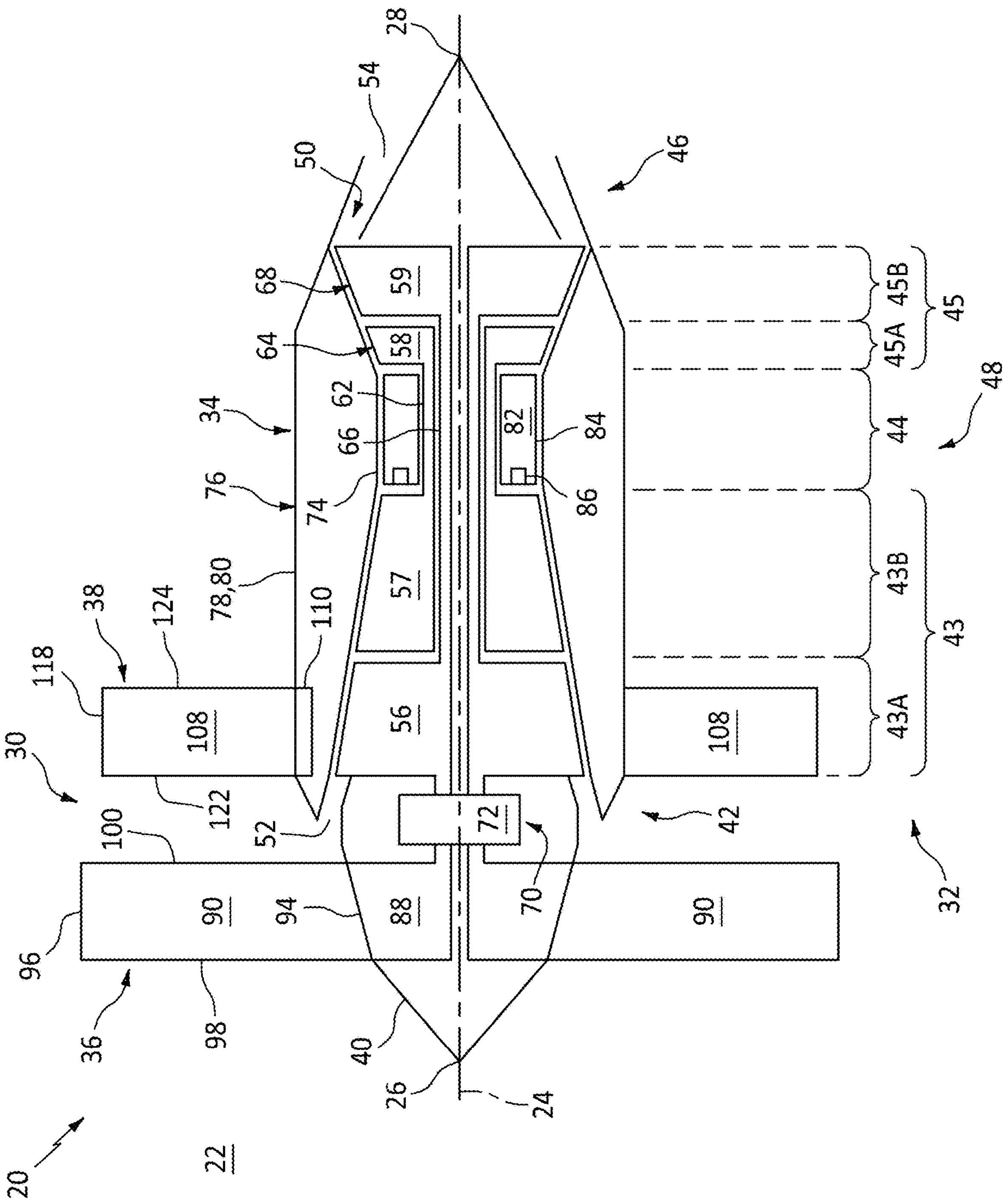
FIG. 1 is a side schematic illustration of an aircraft propulsion system.

FIG. 1 is a schematic illustration of a propulsion system 20 for an aircraft. The aircraft may be an airplane, a drone (e.g., an unmanned aerial vehicle (UAV)), or any other manned or unmanned aerial vehicle or system. The aircraft propulsion system 20 may be configured as an open rotor propulsion system with a single open propulsor rotor and swirl recovery vane (SRV) architecture. Herein, the term “open” may describe a propulsion system section and/or a propulsion system component which is open to an environment 22 (e.g., an ambient environment) external to the aircraft propulsion system 20 and, more generally, the aircraft.

The aircraft propulsion system 20 extends axially along an axis 24 of the aircraft propulsion system 20 between an upstream, forward end 26 of the aircraft propulsion system 20 and a downstream, aft end 28 of the aircraft propulsion system 20. The propulsion system axis 24 may be a centerline axis of the aircraft propulsion system 20 and/or a centerline axis of one or more members of the aircraft propulsion system 20. The propulsion system axis 24 may also or alternatively be a rotational axis of one or more members of the aircraft propulsion system 20. The aircraft propulsion system 20 of FIG. 1 includes an open rotor propulsion section 30 (e.g., an open rotor propulsion module), a gas turbine engine 32 and a stationary housing structure 34.

The propulsion section 30 includes an open propulsor rotor 36 and an open guide vane structure 38. These propulsion section members 36 and 38 are un-ducted components of the aircraft propulsion system 20 and its propulsion section 30. The propulsion section 30 of FIG. 1 also includes a nose cone 40 disposed at (e.g., on, adjacent or proximate) the propulsion system forward end 26. Briefly, this nose cone 40 may be configured as a spinner which is rotatable with the propulsor rotor 36 about the propulsion system axis 24. Alternatively, the nose cone 40 may be configured as a stationary structure of the propulsion section 30.

The turbine engine 32 is configured to power operation of the propulsion section 30. The turbine engine 32 includes an inlet section 42, a compressor section 43, a combustor section 44, a turbine section 45 and an exhaust section 46. The compressor section 43 of FIG. 1 includes a low pressure compressor (LPC) section 43A and a high pressure compressor (HPC) section 43B. The turbine section 45 of FIG. 1 includes a high pressure turbine (HPT) section 45A and a low pressure turbine (LPT) section 45B. At least (or only) the LPC section 43A, the HPC section 43B, the combustor section 44, the HPT section 45A and the LPT section 45B collectively form a core 48 (e.g., a gas generator) of the turbine engine 32. The aircraft propulsion system 20 and its turbine engine 32 also include an engine flowpath 50; e.g., an annular core flowpath. This engine flowpath 50 extends through the engine core 48 from an airflow inlet 52 into the engine flowpath 50 to a combustion products exhaust 54 from the engine flowpath 50. The flowpath inlet 52 of FIG. 1 is also an airflow inlet into the aircraft propulsion system 20 and its turbine engine 32. The flowpath exhaust 54 of FIG. 1 is also a combustion products exhaust from the aircraft propulsion system 20 and its turbine engine 32.

The LPC section 43A includes a bladed low pressure compressor (LPC) rotor 56. The HPC section 43B includes a bladed high pressure compressor (HPC) rotor 57. The HPT section 45A includes a bladed high pressure turbine (HPT) rotor 58. The LPT section 45B includes a bladed low pressure turbine (LPT) rotor 59. Each of these engine rotors 56-59 includes a rotor base (e.g., a disk or a hub) and a plurality of rotor blades (e.g., airfoils, vanes, etc.). The rotor blades are arranged and may be equispaced circumferentially around the respective rotor base in an array. The rotor blades may also be arranged into one or more stages longitudinally along the engine flowpath 50. Each of the rotor blades is connected to the respective rotor base. Each of the rotor blades projects radially (e.g., spanwise) out from the respective rotor base into the engine flowpath 50 and to a distal tip of the respective rotor blade.

The HPC rotor 57 is coupled to and rotatable with the HPT rotor 58. The HPC rotor 57 of FIG. 1, for example, is connected to the HPT rotor 58 by a high speed shaft 62. At least (or only) the HPC rotor 57, the HPT rotor 58 and the high speed shaft 62 collectively form a high speed rotating structure 64; e.g., a high speed spool of the turbine engine 32 and its engine core 48. This high speed rotating structure 64 of FIG. 1 and its members 57, 58 and 62 are rotatable about the propulsion system axis 24. However, in other embodiments, the high speed rotating structure 64 may alternatively be rotatable about another rotational axis which is (e.g., laterally and/or angularly) offset from the rotational axis of the propulsor rotor 36.

The LPC rotor 56 is coupled to and rotatable with the LPT rotor 59. The LPC rotor 56 of FIG. 1, for example, is connected to the LPT rotor 59 by a low speed shaft 66. At least (or only) the LPC rotor 56, the LPT rotor 59 and the low speed shaft 66 collectively form a low speed rotating structure 68; e.g., a low speed spool of the turbine engine 32 and its engine core 48. This low speed rotating structure 68 of FIG. 1 and its members 56, 59 and 66 are rotatable about the propulsion system axis 24. However, in other embodiments, the low speed rotating structure 68 may alternatively be rotatable about another rotational axis which is (e.g., laterally and/or angularly) offset from the rotational axis of the propulsor rotor 36.

The low speed rotating structure 68 is coupled to the propulsor rotor 36 through a drivetrain 70. This drivetrain 70 may be configured as a geared drivetrain, where a geartrain 72 (e.g., a transmission, a speed change device, an epicyclic geartrain, etc.) is disposed between and operatively couples the propulsor rotor 36 to the low speed rotating structure 68 and its LPT rotor 59. With this arrangement, the propulsor rotor 36 may rotate at a different (e.g., slower) rotational speed than the low speed rotating structure 68 and its LPT rotor 59. Here, the propulsor rotor 36 and the low speed rotating structure 68 may rotate in a common (the same) direction about the propulsion system axis 24 or in opposite directions about the propulsion system axis 24 depending, for example, upon the specific configuration of the geartrain 72. Alternatively, the drivetrain 70 may be configured as a direct-drive drivetrain, where the geartrain 72 is omitted. With such an arrangement, the propulsor rotor 36 rotates at a common (the same) rotational speed as the low speed rotating structure 68 and its LPT rotor 59.

The engine sections 42-46 may be arranged sequentially along the propulsion system axis 24 and are housed within and/or formed by the housing structure 34. This housing structure 34 includes an engine case 74 (e.g., a multi-section core case) and a propulsion system nacelle 76. The engine case 74 houses one or more of the engine sections 43A-45B; e.g., the engine core 48. The engine case 74 of FIG. 1, for example, extends axially along (e.g., axially overlaps) and extends circumferentially about (e.g., circumscribes) the engine sections 43A-45B and the engine rotors 56-59. The engine case 74 may also house at least a portion of the drivetrain 70 and its geartrain 72. The propulsion system nacelle 76 houses and provides an aerodynamic cover over the engine case 74. An exterior wall 78 of the propulsion system nacelle 76 of FIG. 1, for example, is disposed radially outboard of, extends axially along (e.g., axially overlaps) and extends circumferentially about (e.g., circumscribes) the engine core 48 and its engine case 74. This nacelle wall 78 may at least partially or completely form an exterior surface 80 of the housing structure 34 and borders the external environment 22. With the foregoing arrangement, the engine rotors 56-59 are disposed within the housing structure 34. By contrast, the propulsor rotor 36 and the guide vane structure 38 are disposed outside of the housing structure 34 and within the external environment 22.

During operation of the aircraft propulsion system 20 of FIG. 1, ambient air within the external environment 22 is propelled by the rotating propulsor rotor 36 in the downstream, aft direction towards the propulsion system aft end 28. A major portion (e.g., more than 50%) of this air bypasses the turbine engine 32 to provide forward thrust while a minor portion (e.g., less than 50%) of the air flows into the aircraft propulsion system 20 and its turbine engine 32. For example, an outer stream of the air propelled by the rotating propulsor rotor 36 flows axially across the guide vane structure 38 and outside of the housing structure 34 and its exterior surface 80; e.g., along an exterior of the propulsion system nacelle 76. The guide vane structure 38 conditions (e.g., straightens out, de-swirls, etc.) the outer stream of air within the external environment 22 to enhance the forward thrust. By contrast, an inner stream of the air propelled by the rotating propulsor rotor 36 may bypass the guide vane structure 38 and enter the turbine engine 32 and its engine flowpath 50 through the flowpath inlet 52. The air entering the engine flowpath 50 through the flowpath inlet 52 may be referred to as "core air".

The core air is compressed by the LPC rotor 56 and the HPC rotor 57 and directed into a combustion chamber 82 (e.g., an annular combustion chamber) of a combustor 84 (e.g., an annular combustor) in the combustor section 44. Fuel is injected into the combustion chamber 82 by one or more fuel injectors 86 and mixed with the compressed core air to provide a fuel-air mixture. This fuel-air mixture is ignited and combustion products thereof flow through and sequentially drive rotation of the HPT rotor 58 and the LPT rotor 59. The rotation of the HPT rotor 58 and the LPT rotor 59 respectively drive rotation of the HPC rotor 57 and the LPC rotor 56 and, thus, compression of the core air. The rotation of the LPT rotor 59 also drives the rotation of the propulsor rotor 36 through the drivetrain 70 and its geartrain 72. The turbine engine 32 and its low speed rotating structure 68 thereby power operation of (e.g., drive rotation of) the propulsor rotor 36 during aircraft propulsion system operation.

Figure 2:
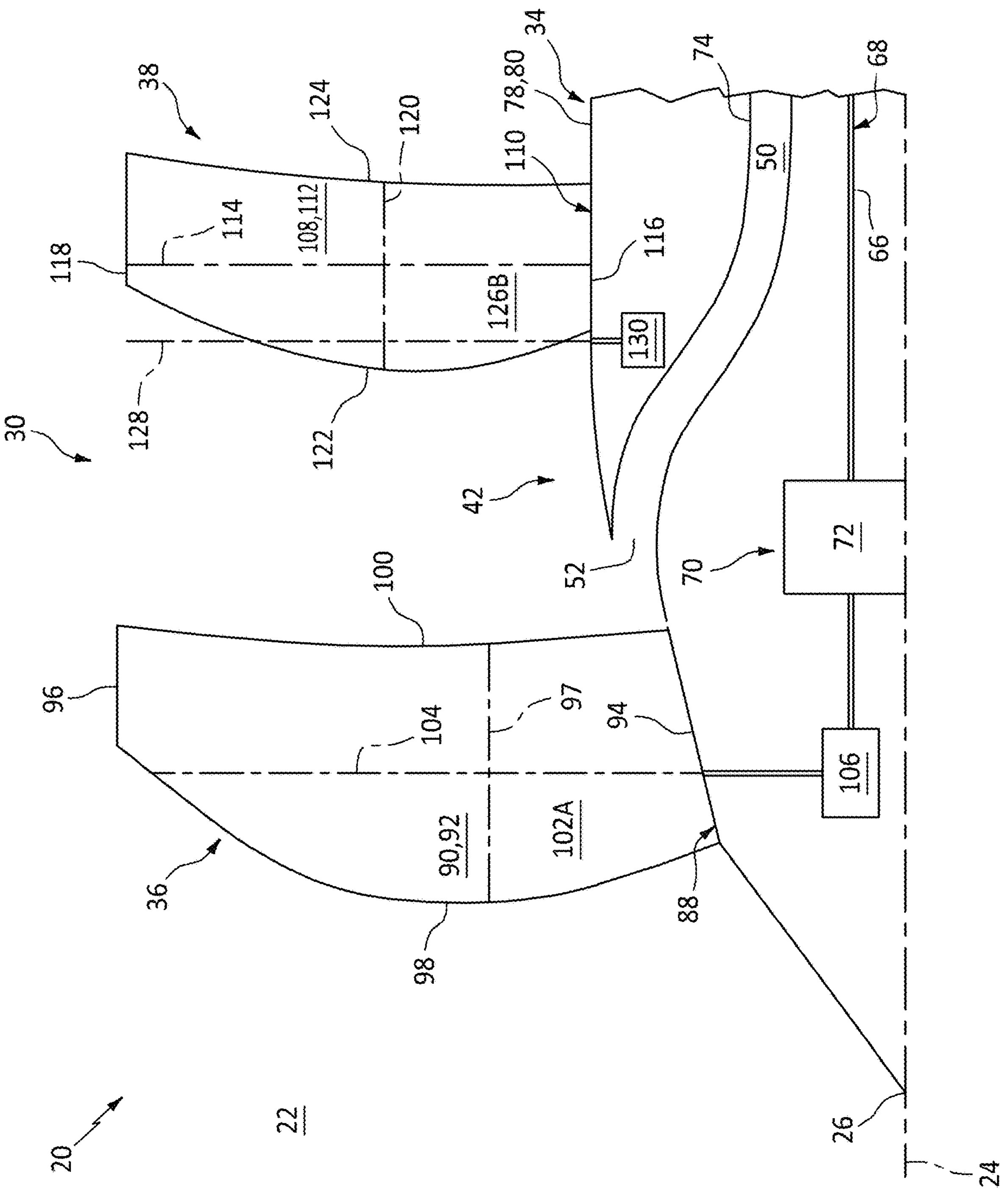
FIG. 2 is a partial schematic illustration of the aircraft propulsion system at a propulsion section.

Referring to FIG. 2, the propulsor rotor 36 includes a rotor base 88 and a plurality of open propulsor blades 90. The propulsor blades 90 are arranged and may be equispaced circumferentially about the rotor base 88 and the propulsion system axis 24 in an array; e.g., a circular array. This array of the propulsor blades 90 may be unshrouded or alternatively shrouded by a tubular propulsor rotor shroud dedicated to the propulsor rotor 36 for example. Each of the propulsor blades 90 is connected to (e.g., formed integral with or otherwise attached to) the rotor base 88.

An airfoil 92 of each propulsor blade 90 projects spanwise along a blade span line of the blade airfoil 92 (e.g., generally radially relative to the propulsion system axis 24) out from an exterior surface 94 of the rotor base 88, into the external environment 22, to a distal tip 96 of the respective propulsor blade 90 and its blade airfoil 92. Here, the rotor base exterior surface 94 radially borders the external environment 22 and forms an inner platform surface of the propulsor rotor 36. Each propulsor blade 90 is thereby configured as an unducted propulsor blade which is exposed to (e.g., disposed in) the surrounding external environment 22.

Figure 3:
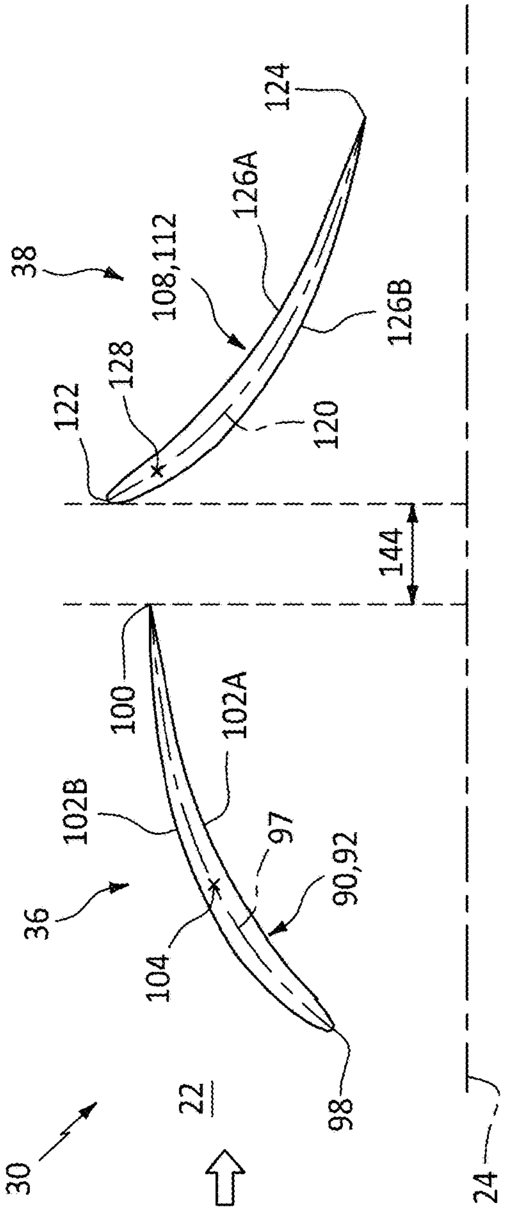
FIGS. 3 and 4 are plan view illustrations of a propulsor blade and a guide vane in various arrangements.
Figure 4:
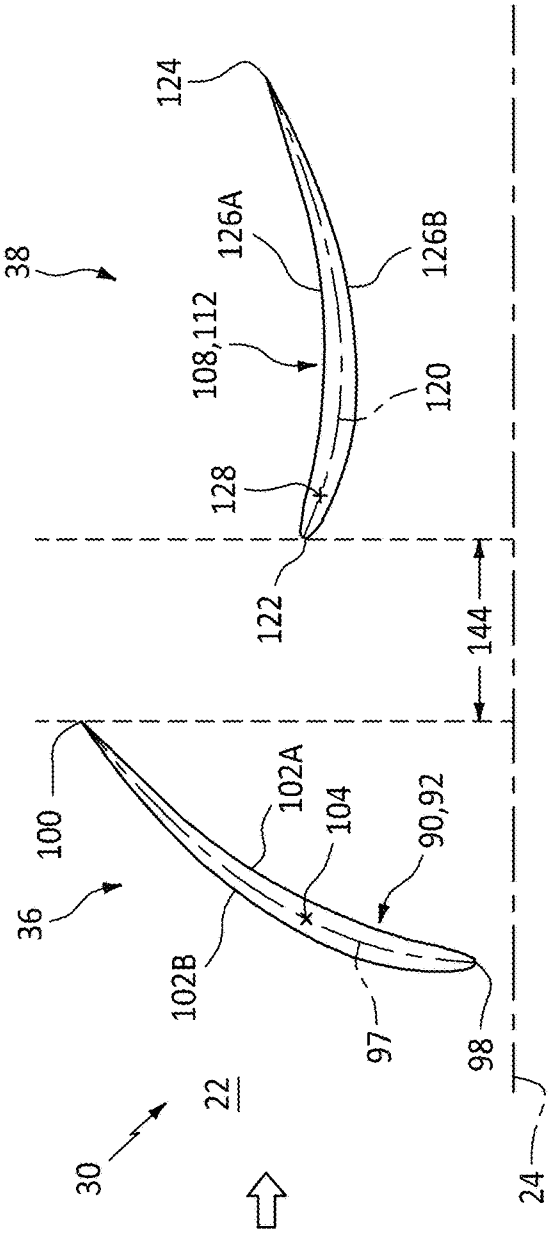

Referring to FIGS. 3 and 4, each blade airfoil 92 extends longitudinally along a blade mean line 97 of the respective blade airfoil 92 from a blade leading edge 98 of the respective blade airfoil 92 to a blade trailing edge 100 of the respective blade airfoil 92. Briefly, the blade mean line 97 is shown in FIGS. 3 and 4 as a camber line of the respective blade airfoil 92 and that blade airfoil 92 is configured with a cambered cross-sectional geometry. It is contemplated, however, the blade mean line 97 may alternatively be a chord line of the respective blade airfoil 92 where that blade airfoil 92 is configured with a symmetric cross-sectional geometry. Referring again to FIGS. 3 and 4, each blade airfoil 92 extends laterally (e.g., perpendicular to the blade mean line 97 and the blade span line) between and to opposing lateral exterior blade side surfaces 102A and 102B (generally referred to as "102") of the respective blade airfoil 92. The blade first side surface 102A of FIGS. 3 and 4 is a concave, pressure side surface of the respective blade airfoil 92. The blade second side surface 102B of FIGS. 3 and 4 is a convex, suction side surface of the respective blade airfoil 92. These blade side surfaces 102 extend longitudinally along the blade mean line 97 between and meet at the blade leading edge 98 and the blade trailing edge 100. Referring to FIG. 2, each blade airfoil element 98, 100, 102A and 102B (the blade second side surface 102B not visible in FIG. 2) extends spanwise along the blade span line from the rotor base exterior surface 94 to the respective blade tip 96.

Each propulsor blade 90 and its blade airfoil 92 may be configured to pivot about a pivot axis 104 of the respective propulsor blade 90. This blade pivot axis 104 extends generally radially relative to the propulsion system axis 24. Each propulsor blade 90 of FIG. 2 is operatively coupled with a blade actuation system 106. This blade actuation system 106 is configured to pivot each propulsor blade 90 about its blade pivot axis 104 between a first position (e.g., see FIG. 3) and a second position (e.g., see FIG. 4). By moving the respective propulsor blade 90 from (or about) the first position of FIG. 3 to (or towards) the second position of FIG. 4 (or vice versa or somewhere therebetween), a pitch of the respective propulsor blade 90 and its blade airfoil 92 may be changed; e.g., decreased (or increased). However, it is contemplated some or all of the propulsor blades 90 may alternatively be fixed position propulsor blades.

The guide vane structure 38 of FIG. 2 includes a plurality of open exit guide vanes 108 that are arranged and may be equispaced circumferentially about the propulsion system axis 24 in an array; e.g., a circular array. This array of the guide vanes 108 may be unshrouded or alternatively shrouded by a tubular guide vane shroud dedicated to the guide vane structure 38 for example. The guide vane structure 38 and its guide vanes 108 are arranged axially next to the propulsor rotor 36 and its propulsor blades 90. The guide vane structure 38 and its guide vanes 108 of FIG. 2, for example, are arranged downstream of the propulsor rotor 36 and its propulsor blades 90, without (e.g., any) other elements axially therebetween to obstruct, turn and/or otherwise influence the air propelled by the propulsor rotor 36 to the guide vane structure 38 for example. Each of the guide vanes 108 of FIG. 2 is coupled to a support structure 110 of the housing structure 34 (see FIG. 1). This support structure 110 may be configured as or otherwise include a support frame, a case and/or another fixed structure of the housing structure 34. The support structure 110 may also or alternatively partially or completely form a radial inner platform for the guide vane structure 38.

An airfoil 112 of each guide vane 108 projects spanwise along a vane span line 114 of the vane airfoil 112 (e.g., generally radially relative to the propulsion system axis 24) out from a vane base 116 of the vane airfoil 112 to a distal vane tip 118 of the respective guide vane 108 and its vane airfoil 112. The vane base 116 of FIG. 2 is disposed radially next to and outboard of the housing structure exterior surface 80. Each guide vane 108 is thereby configured as an un-ducted guide vane which is exposed to the surrounding external environment 22.

Referring to FIGS. 3 and 4, each vane airfoil 112 extends longitudinally along a vane mean line 120 of the respective vane airfoil 112 from a vane leading edge 122 of the respective vane airfoil 112 to a vane trailing edge 124 of the respective vane airfoil 112. Briefly, the vane mean line 120 is shown in FIGS. 3 and 4 as a camber line of the respective vane airfoil 112 and that vane airfoil 112 is configured with a cambered cross-sectional geometry. It is contemplated, however, the vane mean line 120 may alternatively be a chord line of the respective vane airfoil 112 where that vane airfoil 112 is configured with a symmetric cross-sectional geometry. Referring again to FIGS. 3 and 4, each vane airfoil 112 extends laterally (e.g., perpendicular to the vane mean line 120 and the vane span line 114) between and to opposing lateral exterior vane side surfaces 126A and 126B (generally referred to as "126") of the respective vane airfoil 112. The vane first side surface 126A of FIGS. 3 and 4 is a concave, pressure side surface of the respective vane airfoil 112. The vane second side surface 126B of FIGS. 3 and 4 is a convex, suction side surface of the respective vane airfoil 112. These vane side surfaces 126 extend longitudinally along the vane mean line 120 between and meet at the vane leading edge 122 and the vane trailing edge 124. Referring to FIG. 2, each vane airfoil element 122, 124, 126A and 126B (the vane first side surface 126A not visible in FIG. 2) extends spanwise along the vane span line 114 from the vane base 116 at the housing structure exterior surface 80 to the respective vane tip 118.

Each guide vane 108 and its vane airfoil 112 is configured to pivot about a vane pivot axis 128 of the respective guide vane 108. This vane pivot axis 128 extends generally radially relative to the propulsion system axis 24. Each guide vane 108 of FIG. 2 is operatively coupled with a vane actuation system 130. This vane actuation system 130 may be discrete from or integrated as part of the blade actuation system 106. The vane actuation system 130 is configured to pivot each guide vane 108 about its vane pivot axis 128 between a first position (e.g., see FIG. 3) and a second position (e.g., see FIG. 4). By moving the respective guide vane 108 from (or about) the first position of FIG. 3 to (or towards) the second position of FIG. 4 (or vice versa or somewhere therebetween), a pitch of the respective guide vane 108 and its vane airfoil 112 may be changed; e.g., decreased (or increased).

Figure 5:
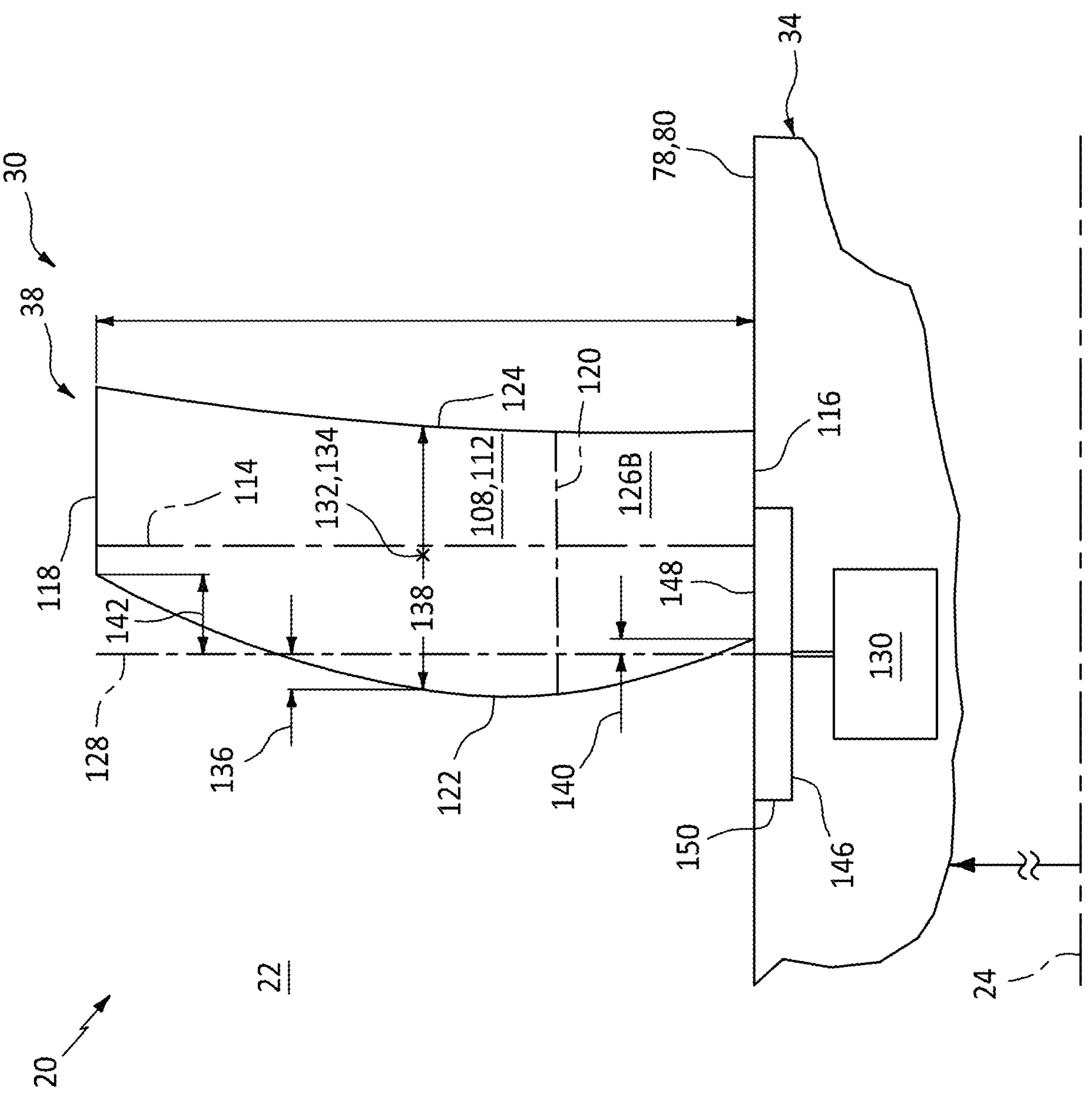
FIG. 5 is a schematic illustration of a portion of the aircraft propulsion system at a guide vane structure with a forward vane pivot axis arrangement.

In some embodiments, referring to FIG. 5, the vane pivot axis 128 of each guide vane 108 and its vane airfoil 112 may be disposed at (or near) the vane leading edge 122 of the respective vane airfoil 112. The vane pivot axis 128 of FIG. 5, for example, is axially aligned along the propulsion system axis 24 with (e.g., axially overlaps) a section of the respective guide vane 108 and its vane airfoil 112 disposed at an intermediate span location 132 spanwise along the vane span line 114 of the vane airfoil 112. For ease of description, the intermediate span location 132 is shown in FIG. 5 and described herein as a midspan location (e.g., a 50% span location) along the vane span line 114 of the vane airfoil 112. However, it is contemplated the intermediate span location 132 may alternatively be a one-third span location, a two-third span location or otherwise in other select applications. At the intermediate span location 132 of FIG. 5, the vane pivot axis 128 is spatially biased towards the vane leading edge 122. For example, at the intermediate span location 132 of FIG. 5, the vane pivot axis 128 is disposed axially along the propulsion system axis 24 (and longitudinally along the vane mean line 120) between a longitudinal center 134 of the vane airfoil 112 and the vane leading edge 122. Here, the longitudinal center 134 is a mid-chord point (e.g., a 50% chord location) between the vane leading edge 122 and the vane trailing edge 124 at the intermediate span location 132. More particularly, at the intermediate span location 132 of FIG. 5, the vane pivot axis 128 is disposed at a leading edge-to-pivot axis (LEPA) axial distance 136 from the vane leading edge 122. This LEPA axial distance 136 may be equal to or less than thirty-five percent (35%) of a chord length 138 of the vane airfoil 112 between the vane leading edge 122 and the vane trailing edge 124 at the intermediate span location 132. The LEPA axial distance 136, for example, may be equal to or less than thirty percent (30%), twenty-five percent (25%), twenty percent (20%), or fifteen percent (15%) of the chord length 138.

While the vane pivot axis 128 of FIG. 5 is axially aligned with the vane airfoil 112 at its intermediate span location 132 as described above, it is contemplated the vane pivot axis 128 may also (or alternatively) be axially offset from (e.g., an entirety of) the vane airfoil 112 along the propulsion system axis 24 at one or more other span locations along the vane span line 114. For example, at the vane base 116, the vane pivot axis 128 may be axially offset along the propulsion system axis 24 from a base section (e.g., a root section) of the vane airfoil 112 at the vane base 116. The vane pivot axis 128 of FIG. 5, for example, is axially offset forward and upstream of the vane leading edge 122 along the propulsion system axis 24 at the vane base 116. More particularly, the vane pivot axis 128 of FIG. 5 is axially spaced forward and upstream of the vane leading edge 122 along the propulsion system axis 24 by a non-zero distance 140 at the vane base 116. In another example, at the vane tip 118, the vane pivot axis 128 may be axially offset along the propulsion system axis 24 from a tip section of the vane airfoil 112 at the vane tip 118. The vane pivot axis 128 of FIG. 5, for example, is axially offset forward and upstream of the vane leading edge 122 along the propulsion system axis 24 at the vane tip 118. More particularly, the vane pivot axis 128 of FIG. 5 is axially spaced forward and upstream of the vane leading edge 122 along the propulsion system axis 24 by a non-zero distance 142 at the vane tip 118. In some embodiments, one or more of the distances 140 and/or 142 may each be sized equal to or less than thirty percent (30%), fifteen percent (15%) or five percent (5%) of the chord length 138, where the chord length 138 is measured at the intermediate span location 132. Alternatively, the vane pivot axis 128 may be disposed adjacent or aligned with the vane leading edge 122 at the vane base 116 and/or at the vane tip 118 (and/or in close spanwise proximity to the vane base 116 and/or the vane tip 118).

Referring to FIGS. 3 and 4, by disposing the vane pivot axis 128 of each guide vane 108 and its vane airfoil 112 at (or near) the vane leading edge 122, a change in an axial inter-member distance 144 (measured between the propulsor rotor 36 and each vane leading edge 122) may be reduced (e.g., minimized) as the guide vanes 108 pivot between different pitch positions compared to arrangements where a vane pivot axis is closer to mid-chord. This arrangement may facilitate a greater degree of turn angle for each guide vane 108 and its vane airfoil 112, which may increase effective thrust and propulsion system efficiency. Moreover, in an unlikely event of a failure in the vane actuation system 130, the flow of the air propelled by the propulsor rotor 36 may push each guide vane 108 into a feather position as a center of pressure along the vane airfoil 112 may be downstream and aft of the vane pivot axis 128.

Referring to FIG. 5, each guide vane 108 may include a vane button 146; e.g., a vane puck. This vane button 146 is connected to (e.g., formed integral with or attached to) the vane airfoil 112 at the vane base 116. The vane airfoil 112 of FIG. 5 projects spanwise along the vane span line 114 out from a radial outer side 148 (relative to the propulsion system axis 24) of the vane button 146 to its vane tip 118. Here, the outer side 148 of the vane button 146 is exposed to and borders the external environment 22. The vane button 146 may thereby partially form an outer peripheral boundary of the aircraft propulsion system 20. The vane button 146 may also provide a bearing support for the pivoting of the respective guide vane 108 about its vane pivot axis 128. The vane button 146 of FIG. 5 includes a cylindrical, conical and/or otherwise annular outer surface 150 which extends circumferentially around and may be coaxial with the vane pivot axis 128 of the respective guide vane 108. In some embodiments, a trailing edge section of the vane airfoil 112 may project longitudinally out and away from the vane button 146 and its outer surface 150 along the vane mean line 120 to the vane trailing edge 124. A section of the vane button 146 may also (or alternatively) project longitudinally out and away from the vane leading edge 122 along the vane mean line 120 (if that vane mean line 120 was extended out from the vane airfoil 112 at the vane leading edge 122).

Figure 6:
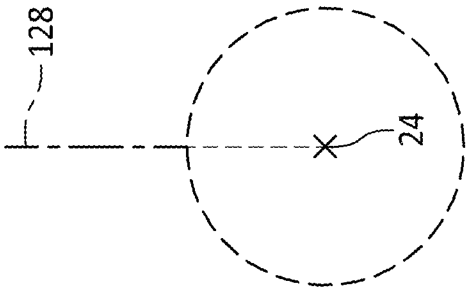
FIG. 6 schematically illustrates a vane pivot axis coplanar with a propulsion system axis.

In some embodiments, referring to FIG. 6, the vane pivot axis 128 may be coplanar with the propulsion system axis 24. The vane pivot axis 128 of FIG. 6, for example, is coincident with the propulsion system axis 24. In other embodiments, referring to FIG. 7, the vane pivot axis 128 may be non-coplanar with the propulsion system axis 24. The vane pivot axis 128 of FIG. 7, for example, is non-coincident with the propulsion system axis 24.

Figure 7:
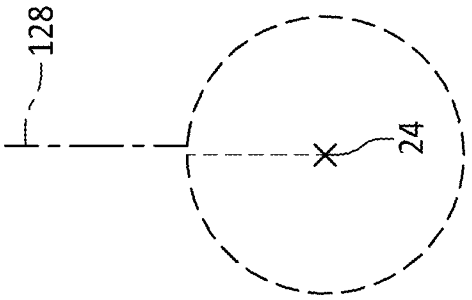
FIG. 7 schematically illustrates the vane pivot axis non-coplanar with the propulsion system axis.
Figure 8:
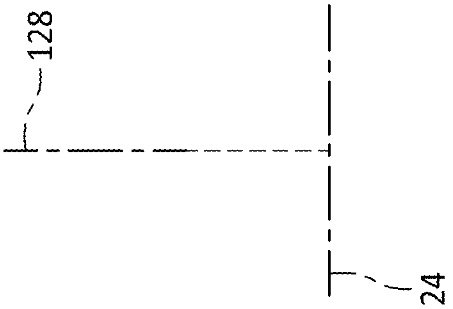
FIG. 8 schematically illustrates the vane pivot axis perpendicular to the propulsion system axis.
Figure 9A:
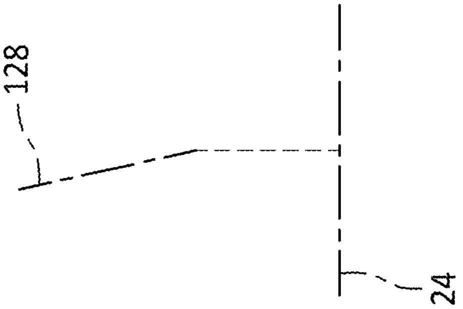
FIGS. 9A and 9B schematically illustrate the vane pivot axis acutely angled relative to the propulsion system axis.
Figure 9B:
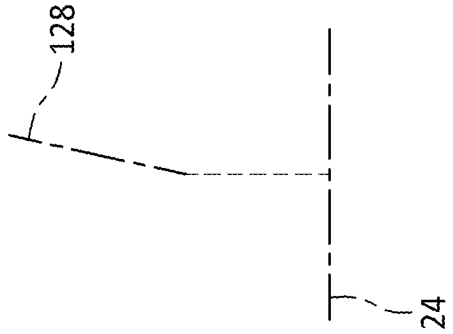

In some embodiments, referring to FIG. 8, the vane pivot axis 128 may be perpendicular to the propulsion system axis 24 when viewed in the longitudinal reference plane parallel with the propulsion system axis 24. In other embodiments, referring to FIGS. 9A and 9B, the vane pivot axis 128 may be angularly offset from the propulsion system axis 24 by an included angle (e.g., a non-zero acute angle) when viewed in the longitudinal reference plane. In FIG. 9A, the vane pivot axis 128 is tilted in a forward, upstream direction. In FIG. 9B, the vane pivot axis 128 is tilted in an aft, downstream direction. Whether the vane pivot axis 128 is arranged as shown in FIG. 8 or FIG. 9A, 9B, the vane pivot axis 128 may be coplanar as shown in FIG. 6 or non-coplanar as shown in FIG. 7.

While the vane pivot axis 128 of each guide vane 108 is described above as being disposed at (or near) the vane leading edge 122, the present disclosure is not limited to such exemplary arrangements. For example, referring to FIG. 10, the vane pivot axis 128 of one, some or all of the guide vanes 108 may alternatively each be disposed at (or near) the vane trailing edge 124. The vane pivot axis 128 of FIG. 10, for example, is axially aligned along the propulsion system axis 24 with (e.g., axially overlaps) the section of the respective guide vane 108 and its vane airfoil 112 disposed at the intermediate span location 132. At this intermediate span location 132 of FIG. 10, the vane pivot axis 128 is spatially biased towards the vane trailing edge 124. For example, at the intermediate span location 132 of FIG. 10, the vane pivot axis 128 is disposed axially along the propulsion system axis 24 (and longitudinally along the vane mean line 120) between the longitudinal center 134 of the vane airfoil 112 and the vane trailing edge 124. More particularly, at the intermediate span location 132 of FIG. 10, the vane pivot axis 128 is disposed a trailing edge-to-pivot axis (TEPA) axial distance 152 from the vane trailing edge 124. This TEPA axial distance 152 may be equal to or less than thirty-five percent (35%) of the chord length 138 at the intermediate span location 132. The TEPA axial distance 152, for example, may be equal to or less than thirty percent (30%), twenty-five percent (25%), twenty percent (20%), or fifteen percent (15%) of the chord length 138.

Figure 10:
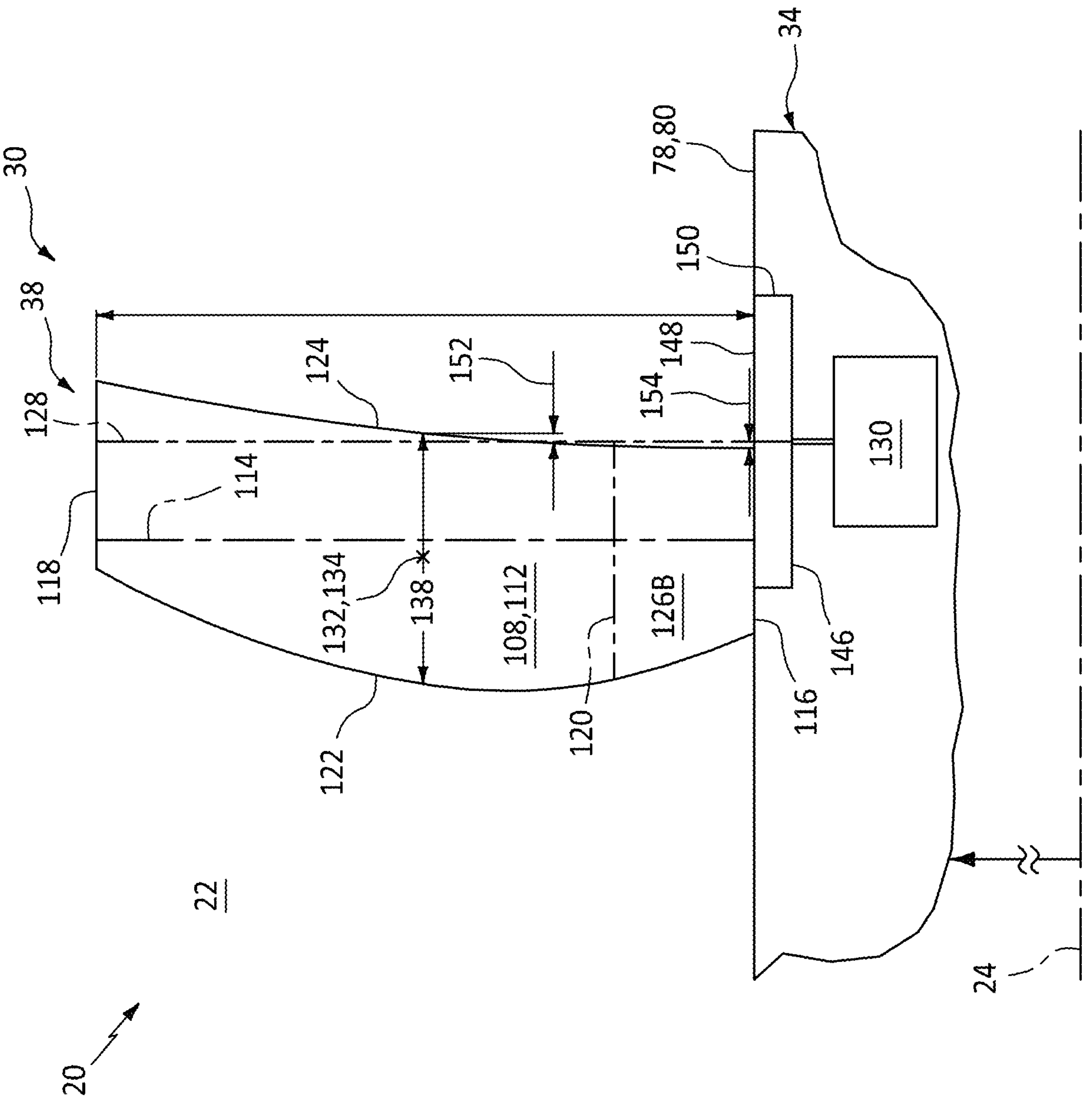
FIG. 10 is a schematic illustration of a portion of the aircraft propulsion system at the guide vane structure with an aft vane pivot axis arrangement.

While the vane pivot axis 128 of FIG. 10 is axially aligned with the vane airfoil 112 at its intermediate span location 132 as described above, it is contemplated the vane pivot axis 128 may also (or alternatively) be axially offset from (e.g., the entirety of) the vane airfoil 112 along the propulsion system axis 24 at one or more other span locations along the vane span line 114. For example, at the vane base 116, the vane pivot axis 128 may be axially offset along the propulsion system axis 24 from the base section of the vane airfoil 112 at the vane base 116. The vane pivot axis 128 of FIG. 10, for example, is axially offset aft and downstream of the vane trailing edge 124 along the propulsion system axis 24 at the vane base 116. More particularly, the vane pivot axis 128 of FIG. 10 is axially spaced aft and downstream of the vane trailing edge 124 along the propulsion system axis 24 by a non-zero distance 154 at the vane base 116. In some embodiments, the distance may be sized equal to or less than thirty percent (30%), fifteen percent (15%) or five percent (5%) of the chord length 138, where the chord length 138 is measured at the intermediate span location 132. Alternatively, the vane pivot axis 128 may be disposed adjacent or aligned with the vane trailing edge 124 at the vane base 116 (and/or in close spanwise proximity to the vane base 116).

The vane button 146 of FIG. 10 is coaxial with the vane pivot axis 128 of the respective guide vane 108. In some embodiments, a leading edge section of the vane airfoil 112 may project longitudinally out and away from the vane button 146 and its outer surface 150 along the vane mean line 120 to the vane leading edge 122. A section of the vane button 146 may also (or alternatively) project longitudinally out and away from the vane trailing edge 124 along the vane mean line 120 (if that vane mean line 120 was extended out from the vane airfoil 112 at the vane trailing edge 124).

It is contemplated the aft disposed vane pivot axis 128 of FIG. 10 may have any one of the axis arrangements described above with respect to FIGS. 6-9B.

For ease of description, the relative positions of the vane pivot axes 128 to the guide vanes 108 and their vane airfoils 112 are described above for a forward pitch position; e.g., see FIG. 3. However, it is contemplated the pivot axis positions may (or may not) also be applicable for various other pitch positions.

The aircraft propulsion system 20 of FIG. 1 and its propulsion section 30 are described above with a tractor configuration; e.g., where the propulsor rotor 36 is disposed at or otherwise near the propulsion system forward end 26. It is contemplated, however, the propulsion section 30 may alternatively be disposed at or otherwise near the propulsion system aft end 28 to provide a pusher fan configuration. Moreover, while the turbine engine 32 is described above with a particular two rotating structure arrangement (e.g., a two-spool architecture), the present disclosure is not limited thereto. For example, the LPC rotor 56 may be omitted to configure the LPT rotor 59 as a power turbine (PT) rotor for the propulsor rotor 36. The turbine engine 32 may also or alternatively include another rotating structure with a bladed compressor rotor in the compressor section 43 and a bladed turbine rotor in the turbine section 45; e.g., an intermediate speed spool for the engine core 48.

The guide vane structure 38 is described above as a fixed (e.g., non-rotatable) guide vane structure. It is contemplated, however, the guide vane structure 38 may alternatively be selectively rotatable about the propulsion system axis 24. With such an arrangement, the aircraft propulsion system 20 may be configured as an open rotor propulsion system with a swirl recovery blade (SRB) open rotor architecture. More particularly, the aircraft propulsion system 20 may operate as: (A) a counter-rotating open rotor (CROR) propulsion system during a dual rotor mode of operation (e.g., when both the propulsor rotor 36 and the structure 38 are counter-rotating about the propulsion system axis 24); and (B) a single open rotor and swirl recovery vane (SRV) propulsion system during a single rotor mode of operation (e.g., when the propulsor rotor 36 is rotating and the structure 38 is rotationally fixed about the propulsion system axis 24). Note, when the guide vane structure 38 is configured to selectively rotate about the propulsion system axis 24, the moving guide vanes 108 operate as propulsor blades.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:

an open propulsor rotor configured to rotate about a rotational axis;

an open guide vane structure axially next to the open propulsor rotor, the open guide vane structure including a plurality of open guide vanes arranged circumferentially about the rotational axis in an array, and the plurality of open guide vanes comprising a first open guide vane; and an airfoil of the first open guide vane comprising a base, a tip, a first side surface, a second side surface, a leading edge, a trailing edge and a mean line, the airfoil projecting spanwise out from the base to the tip, the airfoil extending laterally between the first side surface and the second side surface, and the airfoil extending longitudinally along the mean line between the leading edge and the trailing edge;

the first open guide vane configured to pivot about a pivot axis, and the pivot axis axially offset along the rotational axis from and upstream of the leading edge of the airfoil at the base.

2. The assembly of claim 1, wherein the pivot axis is axially adjacent the airfoil along the rotational axis at the base.

3. The assembly of claim 1, wherein the pivot axis is axially spaced from the airfoil along the rotational axis at the base.

4. An assembly for an aircraft propulsion system, comprising:

an open propulsor rotor configured to rotate about a rotational axis;

an open guide vane structure axially next to the open propulsor rotor, the open guide vane structure including a plurality of open guide vanes arranged circumferentially about the rotational axis in an array, and the plurality of open guide vanes comprising a first open guide vane; and an airfoil of the first open guide vane comprising a base, a tip, a first side surface, a second side surface, a leading edge, a trailing edge and a mean line, the airfoil projecting spanwise out from the base to the tip, the airfoil extending laterally between the first side surface and the second side surface, and the airfoil extending longitudinally along the mean line between the leading edge and the trailing edge;

the first open guide vane configured to pivot about a pivot axis, and the pivot axis axially offset along the rotational axis from the airfoil at the base, wherein the pivot axis is axially downstream of a portion of the trailing edge along the rotational axis at the base.

5. The assembly of claim 1, wherein a button of the first open guide vane is connected to the airfoil at the base; and the button comprises an annular outer surface that extends circumferentially around and is coaxial with the pivot axis.

6. The assembly of claim 5, wherein a section of the airfoil projects longitudinally out and away from the button along the mean line to the trailing edge.

7. The assembly of claim 1, wherein the pivot axis is disposed axially between the leading edge and the trailing edge when viewed at an intermediate span location spanwise between the base and the tip.

8. The assembly of claim 1, wherein the airfoil has a chord length between the leading edge and the trailing edge at a midspan location between the base and the tip;

a section of the airfoil at the midspan location axially overlaps the pivot axis along the rotational axis;

an axial distance along the rotational axis between the pivot axis and a reference edge of the airfoil is equal to or less than thirty-five percent of the chord length; and the reference edge comprises the leading edge or the trailing edge.

9. The assembly of claim 8, wherein the reference edge comprises the leading edge.

10. The assembly of claim 1, wherein the open guide vane structure is configured to condition air propelled by the open propulsor rotor in an environment external to the aircraft propulsion system.

11. The assembly of claim 1, wherein the pivot axis is coplanar with the rotational axis.

12. The assembly of claim 1, wherein the pivot axis is non-coplanar with the rotational axis.

13. The assembly of claim 1, wherein the pivot axis is perpendicular to the rotational axis in a reference plane parallel with the rotational axis.

14. The assembly of claim 1, wherein the pivot axis is angularly offset from the rotational axis by an acute angle in a reference plane parallel with the rotational axis.

15. The assembly of claim 1, further comprising a turbine engine configured to drive rotation of the open propulsor rotor about the rotational axis.

16. An assembly for an aircraft propulsion system, comprising:

an open propulsor rotor configured to rotate about a rotational axis;

an open guide vane structure axially next to the open propulsor rotor, the open guide vane structure including a plurality of open guide vanes arranged circumferentially about the rotational axis in an array, and the plurality of open guide vanes comprising a first open guide vane; and an airfoil of the first open guide vane comprising a base, a tip, a first side surface, a second side surface, a leading edge, a trailing edge and a chord length, the airfoil projecting spanwise out from the base to the tip, the airfoil extending laterally between the first side surface and the second side surface, and the airfoil extending chordwise for the chord length between the leading edge and the trailing edge at a midspan location spanwise between the base and the tip;

the first open guide vane configured to pivot about a pivot axis, the pivot axis axially aligned along the rotational axis with a section of the airfoil at the midspan location, the pivot axis spaced forward an axial distance along the rotational axis from the leading edge of the airfoil at the base, and the axial distance equal to or less than thirty-five percent of the chord length.

17. The assembly of claim 16, wherein the axial distance is equal to or less than thirty percent of the chord length.

* * * * *